US012670776B1

(12) United States Patent
Michleski

(10) Patent No.: US 12,670,776 B1
(45) Date of Patent: Jun. 30, 2026

(54) SYSTEM AND METHOD FOR JEWELRY FOR NON-COMMUNICATIVE INDIVIDUALS AND PETS

(71) Applicant: Veronica Lynn Michleski, Pittsburgh, PA (US)

(72) Inventor: Veronica Lynn Michleski, Pittsburgh, PA (US)

( * ) Notice: Subject to any disclaimer, the term of this patent is extended or adjusted under 35 U.S.C. 154(b) by 0 days.

(21) Appl. No.: 19/077,022

(22) Filed: Mar. 11, 2025

(51) Int. Cl.
*G08B 1/08* (2006.01)
*A44C 5/00* (2006.01)
*A44C 15/00* (2006.01)
*G08B 21/02* (2006.01)

(52) U.S. Cl.
CPC ............ *G08B 21/02* (2013.01); *A44C 5/0007* (2013.01); *A44C 15/005* (2013.01)

(58) Field of Classification Search
CPC ..... G08B 21/02; A44C 5/0007; A44C 15/005; G01S 19/40; G01S 19/14; G01S 19/43; G01S 19/46; G01S 19/48; A01K 11/008; A01K 15/021; A01K 15/023; A01K 27/009; H04W 4/021
USPC ...... 340/539.11, 539.1, 539.13, 573.1, 539.2
See application file for complete search history.

(56) References Cited

U.S. PATENT DOCUMENTS 4,918,432 A 4/1990 Pauley
7,578,433 B1 * 8/2009 Benson .................. A01K 29/00 235/375
8,115,621 B2 2/2012 Rajala et al.
9,449,487 B1 * 9/2016 Spitalny ............. G08B 21/0261
10,096,225 B2 10/2018 Thomas
10,342,302 B2 7/2019 Clark
10,446,015 B2 10/2019 Praplan et al.
10,575,496 B2 * 3/2020 Lasher ................... G06K 19/14
11,393,316 B1 * 7/2022 Rooney .................. G08B 25/12
11,631,317 B2 4/2023 Praplan et al.
11,762,424 B2 9/2023 Edwards
12,118,873 B1 * 10/2024 Springer .............. G08B 25/016
2004/0051845 A1 * 3/2004 Steere ..................... G02C 3/003 351/157
2012/0210501 A1 * 8/2012 Lavin ................. A41D 13/0512 2/468

(Continued)

FOREIGN PATENT DOCUMENTS

TR 2021019670 A2 2/2022

OTHER PUBLICATIONS

"Providing assistance for our loved ones with communication issues," iflneedhelp.org. https://www.ifineedhelp. org/about/page [Date accessed: Oct. 24, 2024].

(Continued)

*Primary Examiner* — Anh V La
(74) *Attorney, Agent, or Firm* — Bold IP, PLLC; Christopher Mayle

(57) ABSTRACT

A system and method for a safety system having a replaceable ornamental charm with a QR code, whereby the charm is connected to a connector portion having a bent connector portion and a spherical body holding various computing devices, whereby the connector portion may be connected to jewelry such as a bracelet or necklace or other apparatus and may have a tamper system along with a global positioning system, whereby a guardian user may have a registered account in a software application on a remote computing device and monitor updates with the individual wearing the charm.

14 Claims, 8 Drawing Sheets

(56) References Cited

U.S. PATENT DOCUMENTS

| | | | | |
|---|---|---|---|---|
| 2015/0048939 | A1 | 2/2015 | Praplan et al. | |
| 2015/0221242 | A1 | 8/2015 | Cable et al. | |
| 2016/0239733 | A1 | 8/2016 | Hertz et al. | |
| 2022/0256811 | A1* | 8/2022 | Romundstad | A45C 13/123 |
| 2023/0315152 | A1* | 10/2023 | Jadidian | G06F 1/3296<br>361/601 |
| 2025/0143421 | A1* | 5/2025 | Ostanin | A44C 7/00 |
| 2025/0155587 | A1* | 5/2025 | Moore | G01S 19/43 |

OTHER PUBLICATIONS

"Keep Me Safe," myassettag.com.https://www.myassettag.com/blog/qr-code-medical-bracelets-kids-with-autism/ [Date accessed: Oct. 24, 2024].

"Assistive Technology for Safety & Independence," angelsense.com, [Date accessed: Oct. 24, 2024].

* cited by examiner

SYSTEM AND METHOD FOR JEWELRY FOR NON-COMMUNICATIVE INDIVIDUALS AND PETS

FIELD OF THE INVENTION

This invention relates to safety devices, and more particularly to jewelry with interconnected identification and notification systems. The design is applicable across the full spectrum of individuals and may be implemented in various formats including a necklace or bracelet with interchangeable components and parts that when detached may send an alert or other trigger.

BRIEF SUMMARY OF THE INVENTION

In some aspects, the techniques described herein relate to a safety monitoring system including: a wearable accessory including: an elongated flexible member having a first end portion and a second end portion; a connector portion attached to the elongated flexible member, the connector portion including: a bent portion; a spherical body connected to the bent portion; and a removable decorative element coupled to the spherical body.

In some aspects, the techniques described herein relate to a safety monitoring system: wherein the spherical body includes a machine-readable optical code.

In some aspects, the techniques described herein relate to a safety monitoring system: wherein a control system contained within the connector portion, the control system including: a sensor system configured to detect separation of components of the wearable accessory; a communication system configured to transmit alerts; and a processor configured to: receive sensor data from the sensor system; determine a location of the wearable accessory; and transmit, via the communication system, an alert including the location when the sensor system detects the separation.

In some aspects, the techniques described herein relate to a safety monitoring system, further including: a software application executable on a remote computing device, the software application configured to: display a status indicator representing a current state of the wearable accessory; receive the alert from the communication system; and display the location of the wearable accessory on a virtual map interface.

In some aspects, the techniques described herein relate to a safety monitoring system, wherein the software application is further configured to: define one or more geographic boundaries on the virtual map interface; and generate an additional alert when the location of the wearable accessory crosses the one or more geographic boundaries.

In some aspects, the techniques described herein relate to a safety monitoring system: wherein the decorative element includes a hypoallergenic rubber material.

In some aspects, the techniques described herein relate to a safety monitoring system, wherein the sensor system includes: a pressure sensor configured to detect the separation of the decorative element from the spherical body; and when detected transmitting the alert.

In some aspects, the techniques described herein relate to a safety monitoring system, wherein the sensor system includes: an accelerometer configured to detect sudden movements of the wearable accessory.

In some aspects, the techniques described herein relate to a safety monitoring system, wherein the elongated flexible member includes a braided or woven material; and the first end portion and the second end portion include complementary fastening elements configured to form a closed loop.

In some aspects, the techniques described herein relate to a safety monitoring system, wherein the elongated flexible member is a necklace.

In some aspects, the techniques described herein relate to a safety monitoring system, wherein the elongated flexible member is a bracelet.

In some aspects, the techniques described herein relate to a safety monitoring system, wherein: the decorative element includes an autism awareness symbol having a heart shape with a puzzle piece motif.

In some aspects, the techniques described herein relate to a safety monitoring system, wherein the safety monitoring system is further configured to: maintain a calendar of activities for each wearable accessory and customize monitoring parameters based on scheduled activities.

In some aspects, the techniques described herein relate to a safety monitoring system, wherein the processor is further configured to: store historical location data; analyze patterns of movement; generate activity reports; and identify unusual deviations from typical movement patterns.

In some aspects, the techniques described herein relate to a safety monitoring system including: a wearable safety system having an electronic housing including: a location tracking system; a wireless communication system; a power source; a processor; and a remote monitoring application configured to: receive location data from the wearable safety system; display real-time status information; maintain historical tracking data; and generate customizable alerts based on predefined conditions.

In some aspects, the techniques described herein relate to a safety monitoring system, wherein the wearable safety system has a connector portion holding the electronic housing, wherein the connector portion is directly connected to a wearable apparatus and a removable decorative element.

In some aspects, the techniques described herein relate to a safety monitoring system, wherein the removable decorative element is removable and interchangeable.

In some aspects, the techniques described herein relate to a safety monitoring system, wherein the connector portion includes a bent portion at 90 degrees, wherein the bent portion is connected to a spherical body, wherein the removable decorative element has an aperture positioned around the spherical body.

In some aspects, the techniques described herein relate to a safety monitoring system, wherein the removable decorative element is removably attached to the spherical body by a magnetic connection.

In some aspects, the techniques described herein relate to a safety monitoring system, wherein the connector portion includes an aperture to be received by the wearable apparatus.

DETAILED DESCRIPTION OF THE INVENTION

Figure 1:
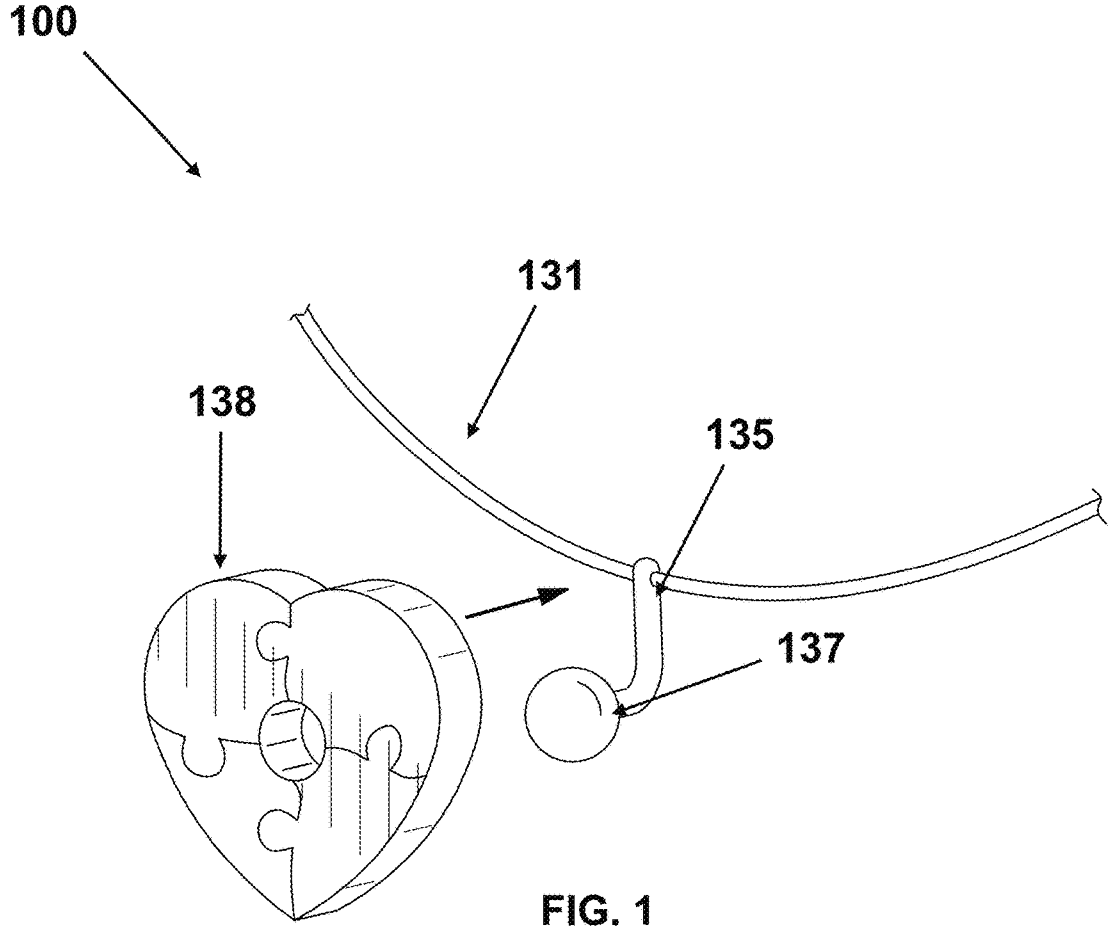
FIG. 1 shows an illustration of the charm being attached to the necklace.
Figure 2:
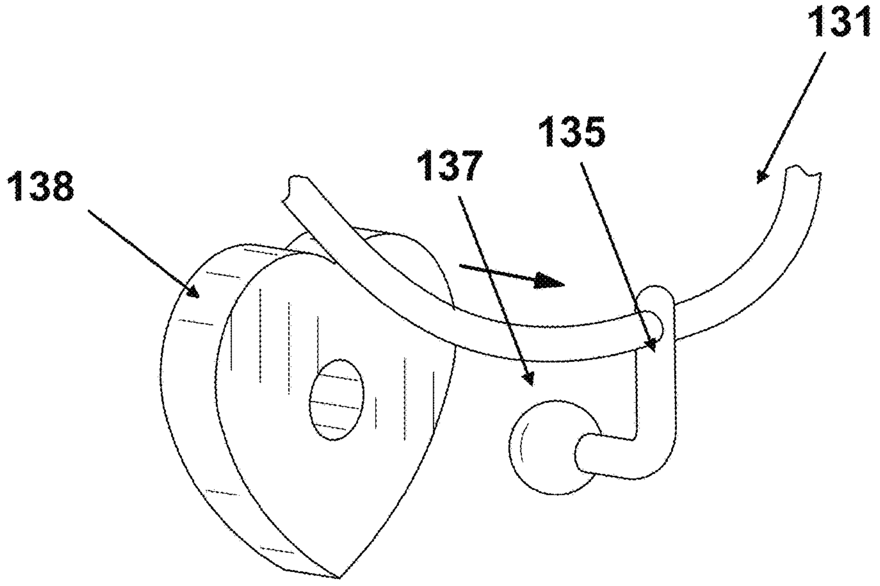
FIG. 2 shows another illustration of the charm being attached to the necklace.
Figure 3:
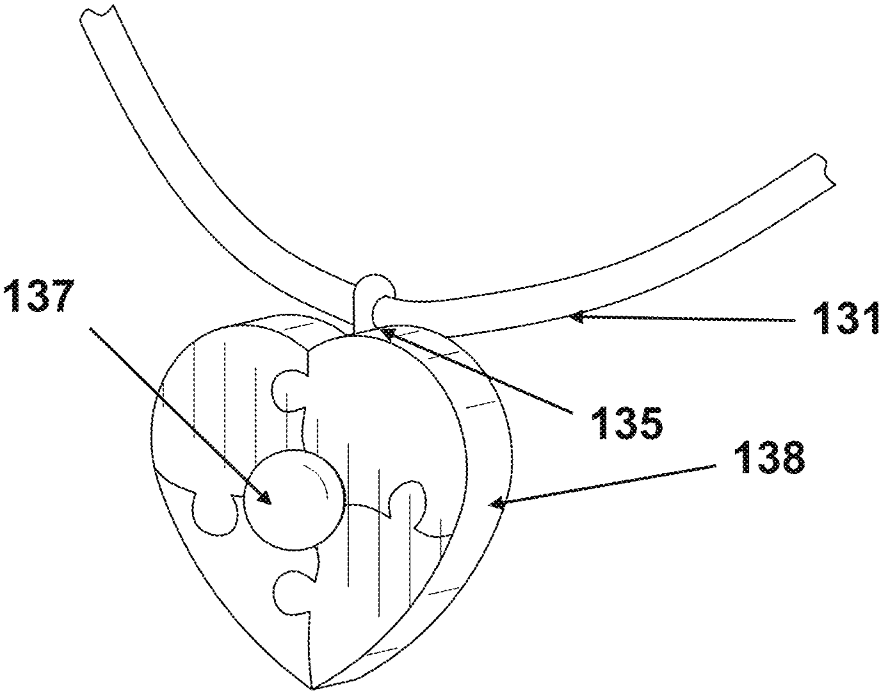
FIG. 3 shows a perspective view of the charm attached to the necklace.
Figure 4:
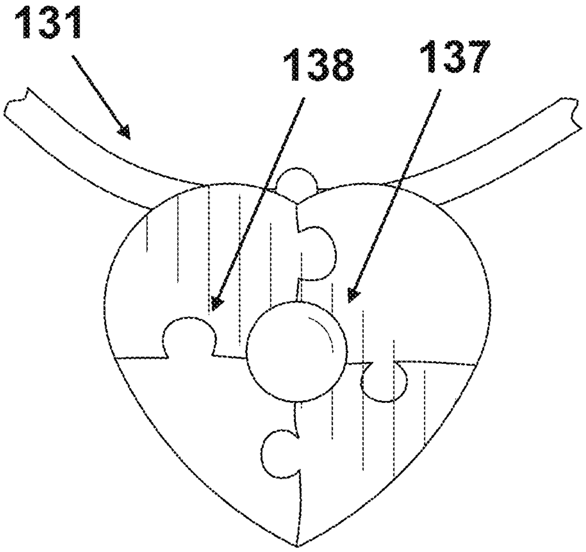
FIG. 4 shows a front view of the charm attached to the necklace.
Figure 5:
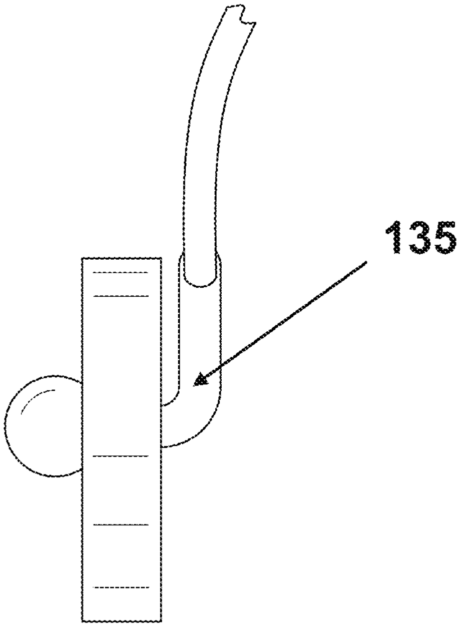
FIG. 5 shows a side view of the charm attached to the necklace.
Figure 6:
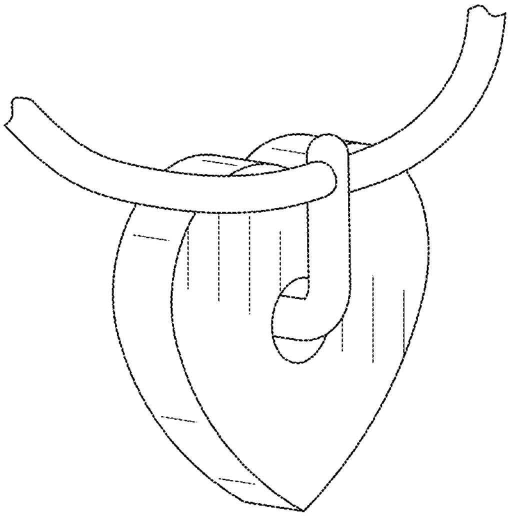
FIG. 6 shows a rear perspective view of the charm attached to the necklace.
Figure 7:
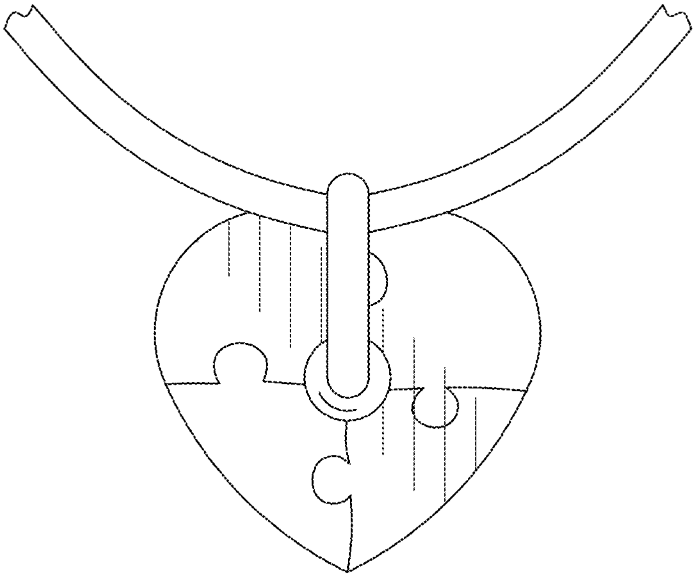
FIG. 7 shows a rear view of the charm attached to the necklace.
Figure 8:
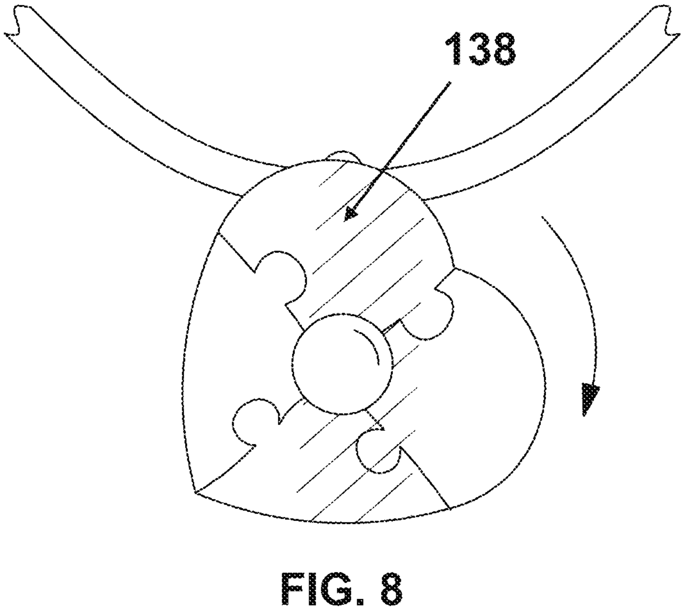
FIG. 8 shows the charm rotating around.
Figure 9:
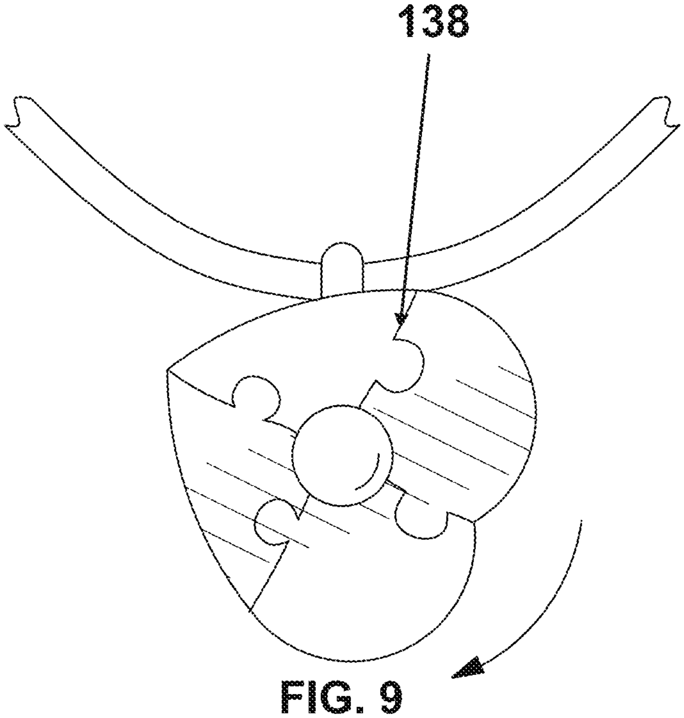
FIG. 9 shows the charm rotating further around.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

The present invention is directed to a safety system for a charm with a QR code on connector system that may have a tamper system and global positioning system connected to an account in an application on a remote computing device.

Figure 12:
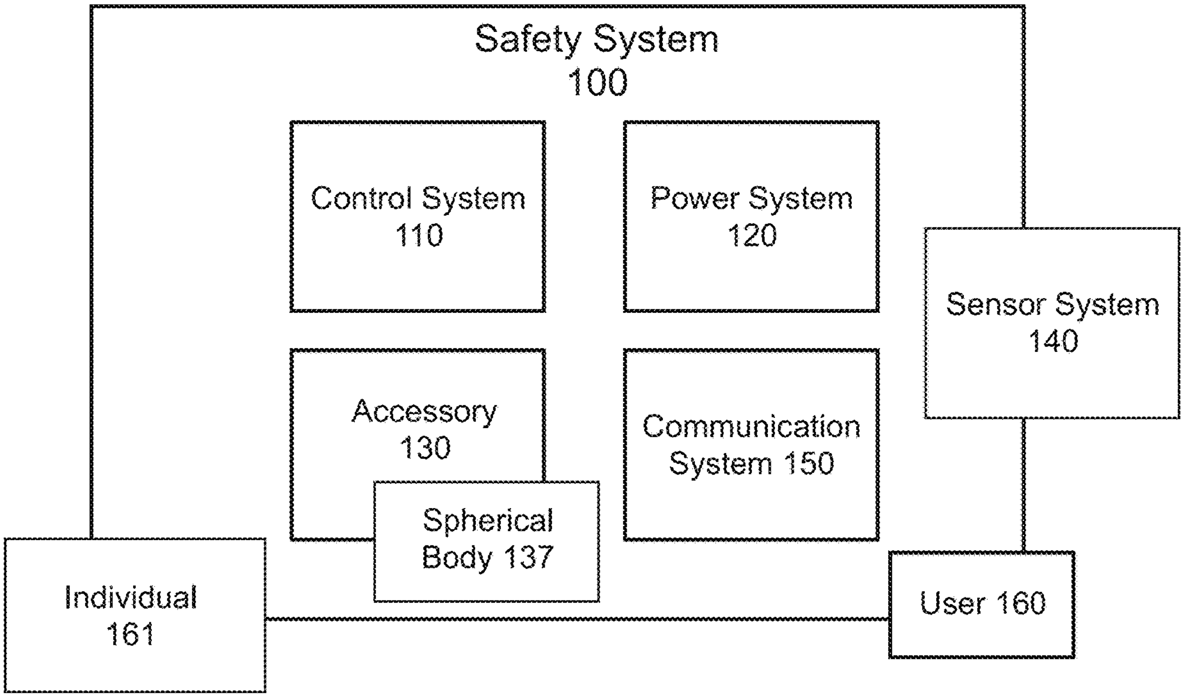
FIG. 12 shows the components of the safety system.

With reference now to FIG. 12, FIG. 12 illustrates a block diagram of one exemplary embodiment of safety system 100. Safety system 100 may have a plurality of systems including a control system 110, a power system 120, a sensor system 140, and a communication system 150, which may be integrated into a wearable accessory 130 of safety system 100. These various components may be contained within a housing of a connector portion which may include a bent portion leading to a spherical body. The various systems may be individually configured and correlated with respect to each other so as to attain the desired objective for a user 160 of locating and protecting an individual 161 who is wearing wearable accessory 130, whereby user 160 and individual 161 may be in a parent-child relationship, a guardianship, or any other type of relationship where user 160 may need to watch over individual 161.

As illustrated in FIG. 1-11, Wearable accessory 130 may include an elongated flexible member 131 formed of braided or woven material defining a first end portion and a second end portion. Wearable accessory 130 may include one or more fasteners such as closure mechanism disposed at the first and second end portions, said closure mechanism configured to removably secure the end portions to form a closed loop. The closure mechanism may comprise complementary fastening elements such as a clasp, spring ring, lobster claw, toggle, or magnetic coupling means suitable for repeated engagement and disengagement while maintaining secure attachment during wear. The closure mechanism of wearable accessory 130 may incorporate an intelligent tamper detection system. The closure mechanism may include conductive elements integrated within the clasp components that form a complete circuit when properly secured. Any interruption of this circuit, whether from authorized opening or unauthorized tampering, triggers an immediate alert through control system 110.

Wearable accessory 130 may have a bended connector portion 135 having a wire or other body with a defining a central aperture or other element dimensioned to receive the elongated flexible member 131 or otherwise be fastened to elongated flexible member 131 with at least one attachment point integrally formed with the connector portion 135. Connector portion 135 may be bent at a 90-degree angle or a straight piece. Connector portion 135 may include a spherical body 137 having a predetermined diameter at the end of the 90-degree angle on the opposite side from elongated flexible member 131 whereby the bent portion may be detachable from the spherical body so a user may consume the spherical body so as to be tracked. This safety consideration provides a potential design modification wherein the bent portion has a more streamlined profile, eliminating the 90-degree angle, to reduce the risk of complications if the component needs to be concealed orally in emergency situations. The smooth, rounded profile of the spherical body would facilitate this emergency measure while maintaining the aesthetic appeal during normal wear. In further embodiments there may be no bent portion and spherical body 137 may be directedly connected to elongated flexible member 131 by a channel on spherical body 137.

Spherical body 137 may include a magnetic material having a magnetic field strength sufficient to maintain coupling for one or more decorative elements 138 during wear. Spherical body 137 may have a channel extending through defining an interior passage whereby the channel is dimensioned to receive the wire. Spherical body 137 may magnetically couple with a complementary magnetic element in one or more decorative elements 138 in a closed loop configuration. This allows safety system 100 to maintain an aesthetically pleasing appearance while utilizing the same core invention for identifying and locating.

Figure 10:
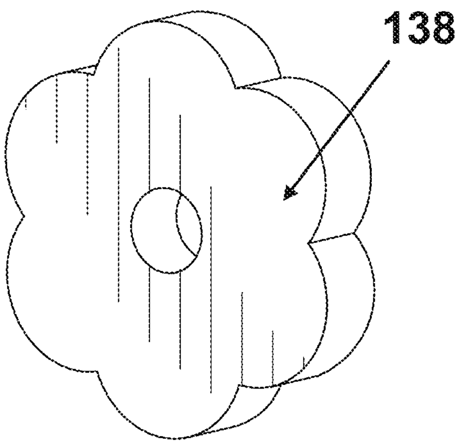
FIG. 10 shows another embodiment of the charm.
Figure 11:
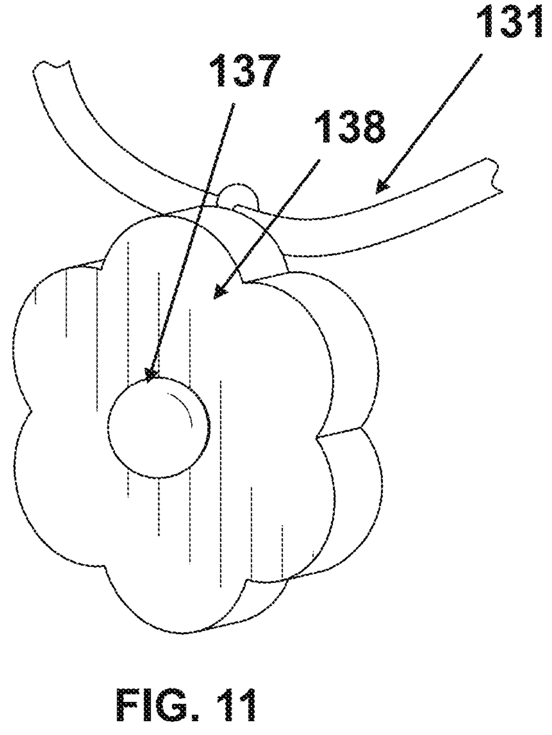
FIG. 11 shows the embodiment of FIG. 10, attached to the necklace.

The one or more decorative elements 138 may include various designs such as an autism awareness symbol whereby the design presents a heart shape with a distinct puzzle piece motif. The heart's outline may be formed by interlocking puzzle pieces. In another embodiment, as illustrated in FIGS. 10 and 11, the design may be a flower with radiating petal segments arranged in a symmetrical pattern around spherical body 137. The one or more decorative elements 138 may be made of rubber material that is hypoallergenic and comfortable such that it is suitable for sensitive skin. The material should be secure and have a difficult-to-remove fastening that does not cause discomfort. The material should also be of water-resistant design for daily activities Spherical body 137 may include a hemispherical portion including an encoded optical pattern in the form of a machine-readable quick response (QR) code. The QR code may be laser etched, engraved, or otherwise permanently marked onto the hemispherical portion. The QR code may be configured to encode predetermined information when scanned by an optical reading device such as the camera on a mobile computing device or a QR code scanner standalone device. In one or more non-limiting embodiments the QR code may encode a unique identifier, a uniform resource locator (URL), personal contact information, emergency medical information, or other scannable data while maintaining the ornamental nature of said accessory.

Power system 120 of safety system 100 may provide power to sensor system 140, and the circuits and components of control system 110 during wear. Safety system 100 may be powered by methods known by those of ordinary skill in the art. In some embodiments, safety system 100 may plug into an electrical outlet using an electrical cord to supply power to sensor system 140, and the circuits and components of control system 110. Further, power system 120 may include a rechargeable battery pack whereby the rechargeable battery is of a charge, design, and capacity to provide sufficient power to sensor system 140 and the circuits and components of control system 110 while running safety system 100 for a set period of time.

Control system 110 may operate to control the actuation of the other systems. Control system 110 may have a series of computing devices which will be discussed in detail later in the description. Control system 110 may be in the form of a circuit board, a memory or other non-transient storage medium in which computer-readable coded instructions are stored and one or more processors configured to execute the instructions stored in the memory. Control system 110 may have a wireless transmitter, a wireless receiver, and a related computer process executing on the processors.

Computing devices of control system 110, may be any type of computing device that typically operate under the control of one or more operating systems, which control scheduling of tasks and access to system resources. Computing devices may be a Raspberry Pi® or other computing devices such as but not limited to a phone, tablet, television, desktop computer, laptop computer, gaming system, wearable device electronic glasses, networked router, networked switch, networked, bridge, or any computing device capable of executing instructions with sufficient processor power and memory capacity to perform operations of control system 110.

The one or more computing devices may be integrated into control system 110, while in other non-limiting embodiments, control system 110 may be a remotely located computing device or server configured to communicate with one or more other control systems 110. Control system 110 may also include an internet connection, network connection, and/or other wired or wireless means of communication (e.g., LAN, etc.) to interact with other components. The connection allows a user, such as user 160, to update, control, send/retrieve information, monitor or otherwise interact passively or actively with control system 110.

Control system 110 may include control circuitry and one or more microprocessors or controllers acting as a servo control mechanism capable of receiving input from sensor system 140 and communication system 150, analyzing the input from sensor system 140 and communication system 150, and generating an output signal to communication system 150 and power system 120. The microprocessors (not shown) may have on-board memory to control the power that is applied to power system 120 and communication system 150 in response to input signals from the user and from sensor system 140.

Control system 110 may be preprogrammed with any reference values, by any combination of hardwiring, software, firmware to implement various operational modes including but not limited to temperature, light, and humidity values. The microprocessors in control system 110 may also monitor the current state of circuitry within control system 110 to determine the specific mode of operation chosen by the user. Further, such microprocessors that may be part of control system 110 may receive signals from any of or all systems, including without limitation, the power system 120, and communication system 150. Such systems may be notified whether any of the components in the various systems need to be replaced, such as the battery.

Figure 13:
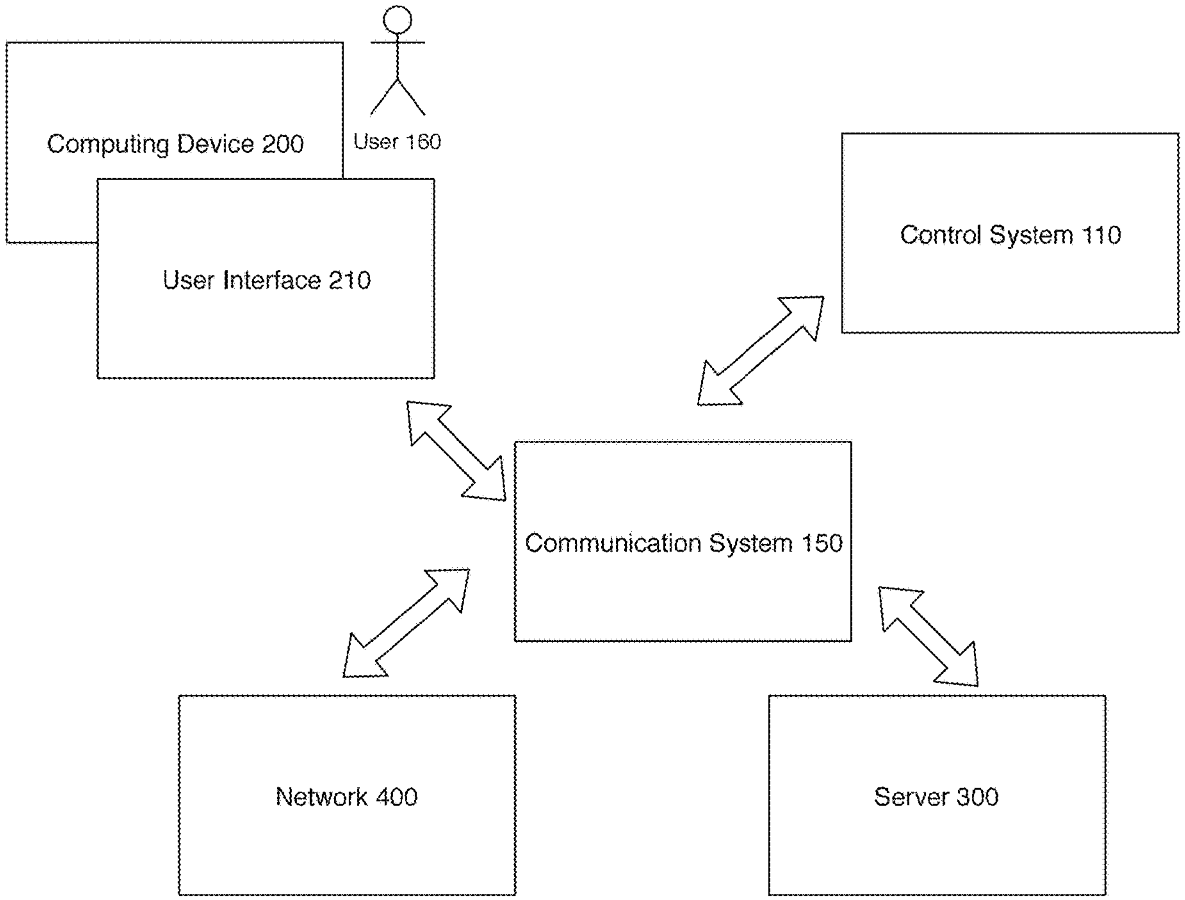
FIG. 13 shows the components of the communication system.

Turning to FIG. 13, FIG. 13 shows an exemplary block diagram of a communication system of safety system 100. Control system 110 may be in communication with communication system 150, as illustrated in FIG. 13, to connect with computing devices whereby signals transmitted from the computing devices may be received by control system 110. Communication system 150 may allow user 160 to interact with control system 110 using a computing device such as computing device 200 even if user 160 is not proximate to control system 110. User 160 may access a user interface, such as user interface 210 using computing device 200. User interface 210 may have a plurality of buttons or icons that are selectable by user 160 for communication system 150 to perform particular processes in response to the selections. In one or more non-limiting embodiments, communication system 150 may be innate, built into, or otherwise integrated into existing platforms or systems such as a website, a third-party program, Apple™ operating systems (e.g., iOS), Android™, Snapchat™, Instagram™, Facebook™, or any other platform.

Computing device 200 of communication system 150 may be similar to the computing devices of control system 110 and may be any type of computing device that typically operates under the control of one or more operating systems, which control scheduling of tasks and access to system resources. Computing device 200, may in some embodiments, be a computing device such as an iPhone™, Android-Based™ phone, or Windows-based™ phone, a tablet, television, desktop computer, laptop computer, gaming system, wearable device electronic glasses, networked router, networked switch, networked, bridge, or any computing device capable of executing instructions with sufficient processor power and memory capacity to perform operations of safety system 100 while in communication with network 400. Computing device 200 may have location tracking capabilities such as Mobile Location Determination System (MLDS) or Global Positioning System (GPS) whereby they may include one or more satellite radios capable of determining the geographical location of computing device 200.

In some embodiments, computing devices 200 may be in communication with one or more servers 300 such as server 300 via communication system 150 or one or more networks such as network 400 connected to communication system 150. Server 300 may be located at a data center, or any other location suitable for providing service to network 400 whereby server 300 may be in one central location or in many different locations in multiple arrangements. Server 300 may comprise a database server such as MySQL® or Maria DB® server. Server 300 may have an attached data storage system storing software applications and data. Server 300 has a number of modules that provide various functions related to communication system 150. Modules may be in the form of software or computer programs that interact with the operating system of server 300 whereby data collected in databases as instruction-based expressions of components and/or processes under communication system 150 may be processed by one or more processors within server 300 or another component of communication system 150 as well as in conjunction with execution of one or more other computer programs.

Modules may be configured to receive commands or requests from computing devices 200, server 300, and outside connected devices over network 400. Server 300 may comprise components, subsystems and modules to support one or more management services for communication system 150.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including telecommunications network, a wireless network (including Wi-Fi), and a wireline network. Network 400 may include mobile telephone networks utilizing any protocol or protocols used to communicate among mobile digital computing devices (e.g., computing device 200), such as GSM, GPRS, UMTS, AMPS, TDMA, or CDMA. In one or more non-limiting embodiments, different types of data may be transmitted via network 400 via different protocols. In alternative embodiments, user computing devices 200, may act as standalone devices or whereby they may operate as peer machines in a peer-to-peer (or distributed) network environment.

Network 400 may further include a system of terminals, gateways, and routers. Network 400 may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if for instance they are in a remote location not accessible by other networks.

Figure 14:
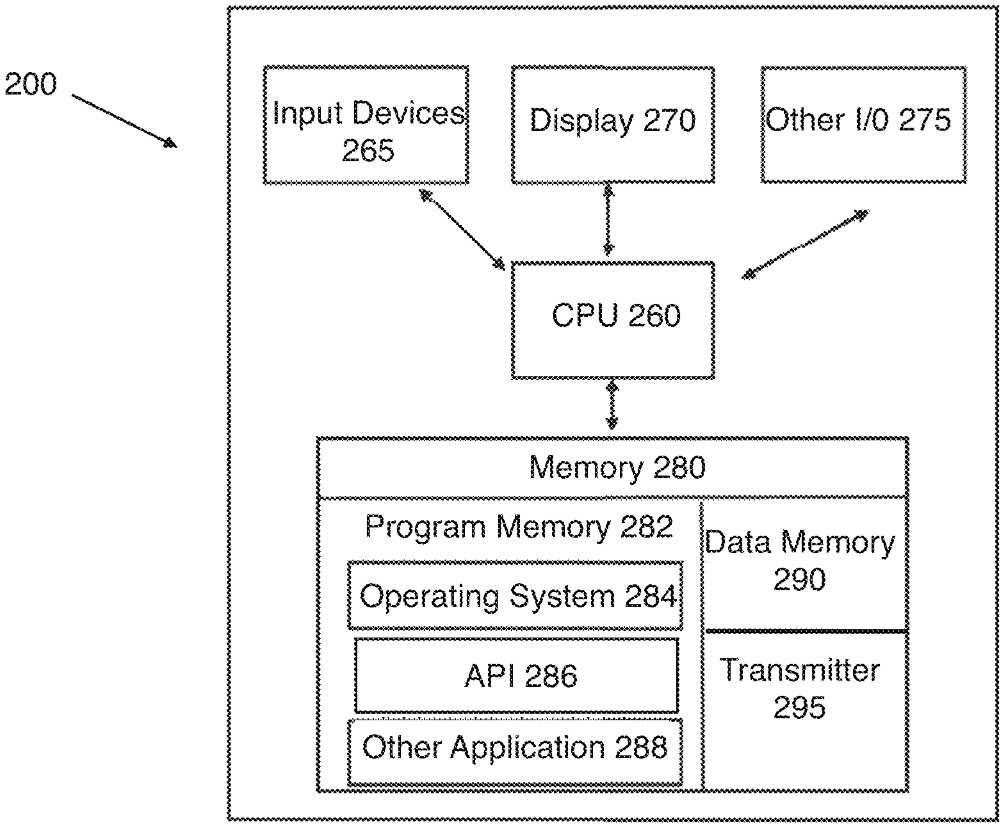
FIG. 14 shows the components of the computing device.

Turning to FIG. 14, FIG. 14 is a block diagram showing various components of computing device 200. Computing device 200 may comprise a housing for containing one or more hardware components that allow access to edit and query communication system 150. User Computing device 200 may include one or more input devices such as input devices 265 that provide input to a CPU (processor) such as CPU 260 of actions related to user 160. Input devices 265 may be implemented as a keyboard, a touchscreen, a mouse, via voice activation, wearable input device, a camera, a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen. Display 270 may also comprise a touch screen interface operable to detect and receive touch input such as a tap or a swiping gesture. Other I/O devices such as I/O devices 275 may also be coupled to the processor, such as a network card, video card, audio card, USB, Fire Wire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of user computing device 200.

Computing device 200 may have a transmitter 295, such as transmitter 295, to transmit the biological data. Transmitter 295 may have a wired or wireless connection and may comprise a multi-band cellular transmitter to connect to the server 300 over 2G/3G/4G cellular networks. Other embodiments may also utilize Near Field Communication (NFC), Bluetooth, or another method to communicate information.

Users 160 may initially register to become a registered user 160 associated with communication system 150. Communication system 150 may be downloadable and installable on computing device 200. In one or more non-limiting embodiments, communication system 150 may be preinstalled on computing devices 200 by the manufacturer or designer. Further, communication system 150 may be implemented using a web browser via a browser extension or plugin. Server 300 may associate computing devices 200 with an account during the registration process. The account may be user 160 specific or specific to a home, enclosure, or other physical boundary that includes multiple users 160, and a unique identification of each computing device 200 may be stored in the account.

Upon successful authentication of user 160, a homepage or dashboard may be generated. Homepages may be modified, deleted, written to, or otherwise administered by the respective user 160. Display 270 may be presented to user 160 through user interface 210 that may include a number of different subpages viewable or accessible through user interface 210 by selecting one or more tabs, User interface 210 on computing device 200 may display statuses for wearable ornamental accessories 130 that are registered or otherwise in communication with control system 110. Accordingly, one area may have multiple wearable ornamental accessories 130, each of which may be separately controllable and viewable on a user's computing device 200. For example, user interface 210 may display information to user 160 logged into an account that includes three different wearable ornamental accessories 130 for three different entities such as a pet, infant, or other entity. A status for each wearable accessory 130 may be displayed on a list or another format on a user's computing device 200 (e.g., including a smartphone).

Different states of wearable ornamental accessories 130 may be displayed by different indicators through user interface 210, whereby control system 110 receives data from sensor system 140, analyzes the data, and presents the data in the form of status indicators to user 160 through user interface 210 of communication system 150. For example, user interface 210 may display a green circle to indicate that wearable ornamental accessories 130 is currently active, functioning properly, and none of the components have been detached or removed User interface 210 may display a grey circle indicating that wearable ornamental accessories 130 is currently inactive but functioning properly. User interface 210 may display a red circle indicating that that one of the components of wearable ornamental accessories 130 has been removed or damaged as determined by one or more sensors. These colors are for illustrative purposes only, as one of ordinary skills would understand alternative colors or shapes or forms of indicating these statuses (including via text and words) may be utilized instead.

User interface 210 may further include a calendar or be synchronized with an outside calendar to display individual's 161 activities for a set period of time, whereby control system 110 may be customized through user interface 210 to be active or inactive during these activities. If individual 161 has multiple wearable ornamental accessories 130, user 160 may be presented with the option to specify which wearable ornamental accessories 130 should be active, as well as inactivating or preventing certain wearable ornamental accessories 130 from sending alerts. User interface 210 may provide user 160 with options to share calendars between accounts.

User interface 210 may have a notification system in place that displays messages for one or more events generated by safety system 100 such as when the wire or spherical body 137 has been removed from the remainder of wearable accessory 130. All of the messages for events that occur with safety system 100 may be grouped into a single thread to organize the messages. In a similar manner, user interface 210 may display the history of events for safety system 100.

After a notification has been transmitted, safety system 100 may also present the past, present, and future location of a wearable accessory 130. The presentation may be in the form of a pop-up window displayed to the user. Computing device 200 may also be presented at any time with a geo-spatial environment having a virtual map of the geographical location in which wearable accessory 130 as well as computing device 200 are located in real time using the global positioning system. The virtual map may have geography and topography, which parallels the geography and topography of the physical real world. For instance, a range of longitudinal and latitudinal coordinates defining a geographic area or space in the real world may be mapped to a corresponding range of longitudinal and latitudinal coordinates defining a virtual space on the virtual map as well as each individual coordinate in the range. The graphical map may be displayed with wearable ornamental accessories 130 displayed as markers, pins, or identifiers at their respective locations.

Wearable ornamental accessories 130 position on the virtual map corresponds to their position in the real world. For instance, a wearable accessory 130 may be located at the corner of Elm and Maple in the real world, which has a corresponding position on the virtual map pertaining to the corner of Elm and Maple. A location tracking module may analyze wearable accessory 130 position as they navigate the range of geographic coordinates in the real world such as when they are moving to their destination. In or more embodiments, the user may set one or more boundaries on the map acting a geofencing capabilities to set safe boundaries and receive alerts if crossed.

Sensor system 140, as shown in FIG. 1, may include a plurality of detectors mounted or otherwise connected to connector portion 135 or spherical body 137 and control system 110. Sensor system 140 may include a sensor function to detect the presence of elongated flexible member 131 or other components of wearable ornamental such that they are connected with spherical body 137 or the connector portion 135 for detecting detachment from flexible member 131 and control system 110 may process data and generate appropriate alerts (e.g., detachment) through communication system 150. Sensors can be embodied in the form of any sensor that is well-known in the art and can be pressure sensors or any number of mechanical switch contained on spherical body 137 or the connector portion 135. For instance, pressure plates may have a mechanism for sensing pressure such as mechanical switches that are activated when enough force is applied to the plate, strain gauges that can measure the exact amount of force applied, or piezoelectric sensors that generate a voltage when pressure is applied, which can then be measured to determine the force. When pressure is applied or removed from pressure plates or they are separated, the plates generate a signal and sensor system 140 sends the signal to control system 110. The generated signal is then used to trigger a response by the control system 110 to send a notification to computing device 200.

Sensor system 140 may include an accelerometer that is a sensor that measures acceleration or the change of velocity with respect to time whereby the accelerometer is connected to control system 110. The accelerometer may be a microelectromechanical systems (MEMS) accelerometer that uses mechanical structures such as microscale springs or beams and microelectronics to convert mechanical motion into an electrical signal. When the accelerometer experiences acceleration, the mechanical structures move, causing a change in electrical properties such as capacitance or resistance, which is then measured to determine the acceleration. Accelerometers may then provide analog or digital output signals that represent the measured acceleration along each axis (x, y, and z). These signals can be processed by a control system to determine deviation from the norm.

Sensor system 140 may include environmental sensors integrated within spherical body 137. The environmental monitoring system may include sensors for detecting air quality, ambient temperature, harmful gases, UV radiation levels, and excessive noise. Control system 110 may process data from environmental monitoring system 190 to identify potential environmental hazards and generate appropriate alerts through communication system 150.

In one or more embodiments, wearable accessory 130 may include an integrated biometric monitoring system contained within spherical body 137. Biometric monitoring system may include a plurality of miniaturized biosensors configured to monitor various physiological parameters of individual 161. The biosensors may include, but are not limited to, optical heart rate sensors, temperature sensors, and galvanic skin response (GSR) sensors. Biometric monitoring system may be in communication with control system 110 to process and analyze the collected biometric data.

Control system 110 may be configured to establish predetermined thresholds for the monitored biometric parameters based on user input or machine learning algorithms analyzing historical data patterns. When biometric monitoring system detects parameters exceeding these thresholds, control system 110 may generate appropriate alerts through communication system 150. For example, if individual 161's heart rate exceeds a specified threshold or exhibits unusual patterns, an alert may be transmitted to user 160's computing device 200.

Sensor system 140 may include a gyroscope sensor capable of detecting rotational movement around multiple axes. Control system 110 may be configured to recognize specific rotational patterns as gesture commands from individual 161. For example, a single clockwise rotation of decorative elements 138 may trigger a check-in notification to user 160, while a counter-clockwise rotation may indicate a request for assistance. Multiple rotations in rapid succession may be interpreted as an emergency alert signal.

The rotation detection subsystem may utilize a low-power MEMS (Micro-Electro-Mechanical Systems) gyroscope that continuously monitors the angular velocity and orientation of decorative element 138 with respect to spherical body 137. Control system 110 may implement pattern recognition algorithms to distinguish intentional rotational gestures from incidental movement during normal wear. The system may be calibrated to recognize rotational gestures within specific angular velocity thresholds and duration parameters to minimize false triggers while ensuring reliable detection of intentional commands.

User interface 210 may provide configuration options for customizing the rotational gesture commands. Through computing device 200, user 160 may define specific rotational patterns and associate them with desired notification types or alert levels. The configuration interface may allow setting sensitivity thresholds, required rotation angles, and timing parameters for gesture recognition. User 160 may also specify different notification recipients or emergency contacts for various rotational patterns, enabling individual 161 to direct alerts to specific caregivers or support personnel through simple physical interactions with wearable accessory 130.

In a practical safety scenario, wearable accessory 130 provides protection during potential threatening situations. Consider a young girl walking through a park who notices a suspicious individual approaching her. Sensing potential danger, she can quickly remove the necklace, which automatically triggers a GPS alert through the safety system. She can then detach the connector portion from the elongated flexible member, remove the decorative element from the spherical body, and conceal the main component (containing the GPS and control systems) in her pocket or even in her mouth if necessary. Since the GPS tracking is contained within the spherical body/connector portion, her location continues to be monitored even after separation from the necklace itself.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

The invention claimed is:

1. A safety monitoring system comprising: a wearable accessory, a connector portion connected to the wearable accessory, the safety monitoring system having a control system within the connector portion, and the control system is configured to detect separation of the connector portion from the wearable accessory, the safety monitoring system having a communication system configured to transmit one or more alerts; and a processor configured to: receive sensor data from a sensor system; determine a location of the wearable accessory; and transmit, via the communication system, an alert of the one or more alerts including the location when the sensor system detects the separation, the safety monitoring system having a software application executable on a remote computing device, the software application configured to: display a status indicator representing a current state of the wearable accessory; receive the alert from the communication system; and display the location of the connector portion on a virtual map interface.

2. The safety monitoring system of claim 1: wherein the connector portion consists of a sphere shape and is detachable so as to be swallowed.

3. The safety monitoring system of claim 1, wherein the software application is further configured to: define one or more geographic boundaries on the virtual map interface; and generate an additional alert when the location of the connector portion crosses the one or more geographic boundaries.

4. The safety monitoring system of claim 1, wherein the sensor system comprises: a pressure sensor configured to detect the separation.

5. The safety monitoring system of claim 1, wherein the sensor system comprises: an accelerometer configured to detect sudden movements of the wearable accessory.

6. The safety monitoring system of claim 1, wherein the wearable accessory has an elongated flexible member having a first end portion and a second end portion, wherein the elongated flexible member is a necklace.

7. The safety monitoring system of claim 1, wherein the safety monitoring system is further configured to: maintain a calendar of activities for each wearable accessory and customize monitoring parameters based on scheduled activities.

8. The safety monitoring system of claim 1, wherein the processor is further configured to: store historical location data; analyze patterns of movement; generate activity reports; and identify unusual deviations from typical movement patterns.

9. A safety monitoring system comprising: a wearable safety system having an electronic housing comprising: a location tracking system; a wireless communication system; a power source; and a processor; the safety monitoring system configured to receive location data from the wearable safety system and display real-time status information, wherein the wearable safety system has a connector component holding the electronic housing that is detachable from the wearable safety system, wherein the safety monitoring system has a removable decorative element wherein the removable decorative element has an aperture positioned around the connector component.

10. The safety monitoring system of claim 9, wherein the removable decorative element is removably attached to the connector component by a magnetic connection.

11. The safety monitoring system of claim 9, wherein the aperture extends therethrough.

12. The safety monitoring system of claim 9, wherein the connector component consists of a sphere.

13. A safety monitoring system comprising: a wearable accessory comprising:

an elongated flexible member having a first end portion and a second end portion;

a connector portion attached to the elongated flexible member, the connector portion comprising: a spherical body; and and a removable decorative element coupled to the spherical body, wherein a control system is inside the connector portion, the control system comprising: a sensor system configured to detect separation of components of the wearable accessory; a communication system configured to transmit alerts; and a processor configured to: receive sensor data from the sensor system; determine a location of the wearable accessory; and transmit, via the communication system, an alert including the location when the sensor system detects the separation.

14. A safety monitoring system comprising: a wearable accessory, a connector portion connected to the wearable accessory, the safety monitoring system having a control system within the connector portion, and the control system is configured to detect separation of the connector portion from the wearable accessory, the safety monitoring system having a removable decorative element removably attached to the connector portion, wherein the removable decorative element comprises a hypoallergenic rubber material.

* * * * *